(12) United States Patent
Yamaguchi

(10) Patent No.: US 8,989,983 B2
(45) Date of Patent: Mar. 24, 2015

(54) MOTORCYCLE

(75) Inventor: Satoshi Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 358 days.

(21) Appl. No.: 13/429,780

(22) Filed: Mar. 26, 2012

(65) Prior Publication Data

US 2012/0253626 A1 Oct. 4, 2012

(30) Foreign Application Priority Data

Mar. 29, 2011 (JP) .................. 2011-072052

(51) Int. Cl.
   *G06F 7/00* (2006.01)
   *B60K 28/16* (2006.01)
   *B60W 50/16* (2012.01)
(52) U.S. Cl.
   CPC ............ *B60K 28/16* (2013.01); *B60W 50/16* (2013.01); *B60W 2300/36* (2013.01); *B60W 2520/263* (2013.01)
   USPC ........................................................ 701/85
(58) Field of Classification Search
   CPC .................. G06F 7/00; G06F 17/00

USPC ......... 701/51, 71, 84, 85, 90, 91, 93
See application file for complete search history.

(56) References Cited

U.S. PATENT DOCUMENTS

| 6,011,378 A * | 1/2000 | Tabata et al. .................. 318/759 |
| 2007/0225882 A1* | 9/2007 | Yamaguchi et al. ............ 701/36 |
| 2012/0239267 A1* | 9/2012 | Kinoshita et al. ............... 701/71 |

FOREIGN PATENT DOCUMENTS

JP 3057691 B2 4/2000

* cited by examiner

*Primary Examiner* — Kim T Nguyen
(74) *Attorney, Agent, or Firm* — Squire Patton Boggs (US) LLP

(57) ABSTRACT

A vehicle can include an anti-slip device configured to detect front and rear wheel speeds at a time of acceleration, and to compute a slip factor from a speed difference. When the slip factor has exceeded the first threshold, a throttle valve is closed so as to lower an engine output. An informing unit and a preliminarily notifying unit are configured to inform the driver when a slip factor has exceeded or is expected to exceed first and second thresholds.

11 Claims, 10 Drawing Sheets

(a)

(b)

(c)

(d)

(a) COMPARATIVE EXAMPLE (b) EXAMPLE

MOTORCYCLE

BACKGROUND

1. Field

The present invention relates to a technology for improving a motorcycle having an anti-slip device for preventing wheels from slipping.

2. Description of the Related Art

There have been made a variety of technologies for improving a motorcycle having an anti-slip device for preventing wheels from slipping, (as shown, for example in Patent Document 1 (Japanese Patent No. 3057691).

As shown in FIG. 2 of Patent Document 1, an internal combustion engine (18) (the parenthesized numeral, here and below, indicates a reference symbol used in Patent Document 1) is provided in an intake passage (30) thereof with a main throttle valve (36) and a sub throttle valve (42).

There is a technology enabling a stand-by control in which the sub throttle valve (42) is kept closed to a predetermined valve position orangle, prior to generation of an actual slip, by predicting a slip of wheels.

The stand-by control is advantageous in that it is thereby possible to take an anti-slip measure swiftly upon actual slipping.

In the case where an anti-slip control is swiftly carried out by the stand-by control as above, the driver abruptly recognizes the anti-slip control. Since the anti-slip control resides in reducing the engine output, it would not make any trouble in the driver's operation. However, an enhanced convenience of the anti-slip control can be expected if the driver is permitted to recognize beforehand that the anti-slip control is to be started.

SUMMARY

It is an object of embodiments of the present invention to provide a technology for preliminarily giving slip information to a driver so that the driver can confirm the driving conditions before an actual anti-slip control is performed.

According to an embodiment of the present invention a vehicle such as a motorcycle can have an anti-slip device which detects a front wheel speed and a rear wheel speed at the time of acceleration. A slip factor is computed from a speed difference between the front wheel speed and the rear wheel speed. When the slip factor has exceeded or is expected to exceed a first threshold, throttle valve is closed so as to lower an engine output and thereby to prevent a wheel or wheels from slipping An informing unit is configured to inform a driver that an anti-slip control is being performed.

A preliminarily notifying is configured to inform a driver, when the slip factor has reached or exceeded or is expected to reach or exceed a second threshold set smaller than the first threshold, that the slip factor reaches or exceeds the second threshold. The preliminarily notifying unit is provided separately from the informing unit.

According to another embodiment of the invention, the preliminarily notifying unit can be a vibration generator incorporated in an accelerator grip to be gripped by the driver.

According to another embodiment of the invention the preliminarily notifying unit can be a vibration generator operative to vibrate a throttle wire interconnecting an accelerator grip to be gripped by the driver and the throttle valve.

According to another embodiment of the invention, the preliminarily notifying unit can be at least one of an exhaust valve pulsative opening/closing control section by which an exhaust valve provided in an exhaust system is opened and closed in a pulsating manner, a swirl valve pulsative opening/closing control section by which a swirl control valve provided in an intake system so as to control an intake flow at an engine combustion chamber is opened and closed in a pulsating manner, and an EGR valve pulsative opening/closing control section by which an EGR valve provided in an exhaust gas recirculation system is opened and closed in a pulsating manner.

According to another embodiment of the invention, the preliminarily notifying unit can be a throttle valve pulsative opening/closing control section by which the throttle valve is opened and closed in a pulsating manner.

According to another embodiment of the invention the period of the pulsation wave created by the throttle valve pulsative opening/closing control section is determined based on the period or cycle of explosion in an engine.

In certain embodiments, before an actual slip is generated, the preliminarily notifying unit enables the driver to recognize the possibility of generation of a slip. Based on this recognition, the driver can take such a measure as returning the accelerator grip.

In certain embodiments, the accelerator grip is vibrated by the vibration generator, whereby the information is transmitted to the driver. As the vibration generator, a small-type inexpensive one is easily available.

According to embodiments of the invention, the throttle wire is vibrated, whereby the accelerator grip is vibrated in an indirect manner. Consequently, the accelerator grip can be simplified in structure.

According to certain embodiments, the preliminarily notifying unit can be at least one of the exhaust valve pulsative opening/closing control section, the swirl valve pulsative opening/closing control section, and the EGR valve pulsative opening/closing control section. The exhaust valve, the swirl control valve or the EGR valve is opened and closed in a pulsating manner so as to change the engine vibration, whereby the slip information is transmitted to the driver. In the case where the exhaust valve, the swirl control valve or the EGR valve is already incorporated in the motorcycle, it is required only to add a pulsative opening/closing control section to the valve control section, so as to prevent an increase in cost.

According to certain embodiments, the preliminarily notifying unit can be the throttle valve pulsative opening/closing control section by which the throttle valve is opened and closed in a pulsating manner. A throttle valve is always incorporated in a motorcycle. Therefore, it is required only to add a pulsative opening/closing control section to the valve control section, so as to keep cost from increasing.

According to certain embodiments, the period of the pulsation wave created by the throttle valve pulsative opening/closing control section is determined based on the period or cycle of explosion in the engine. Accordingly, engine noise and engine vibration can be easily enhanced, whereby the driver can efficiently be let recognize the possibility of a slip.

DETAILED DESCRIPTION

Embodiments of the present invention will be described based on the drawings. Incidentally, the drawings are to be viewed according to the posture of reference symbols.

Working examples of the present invention will be described based on the drawings.

Figure 1:
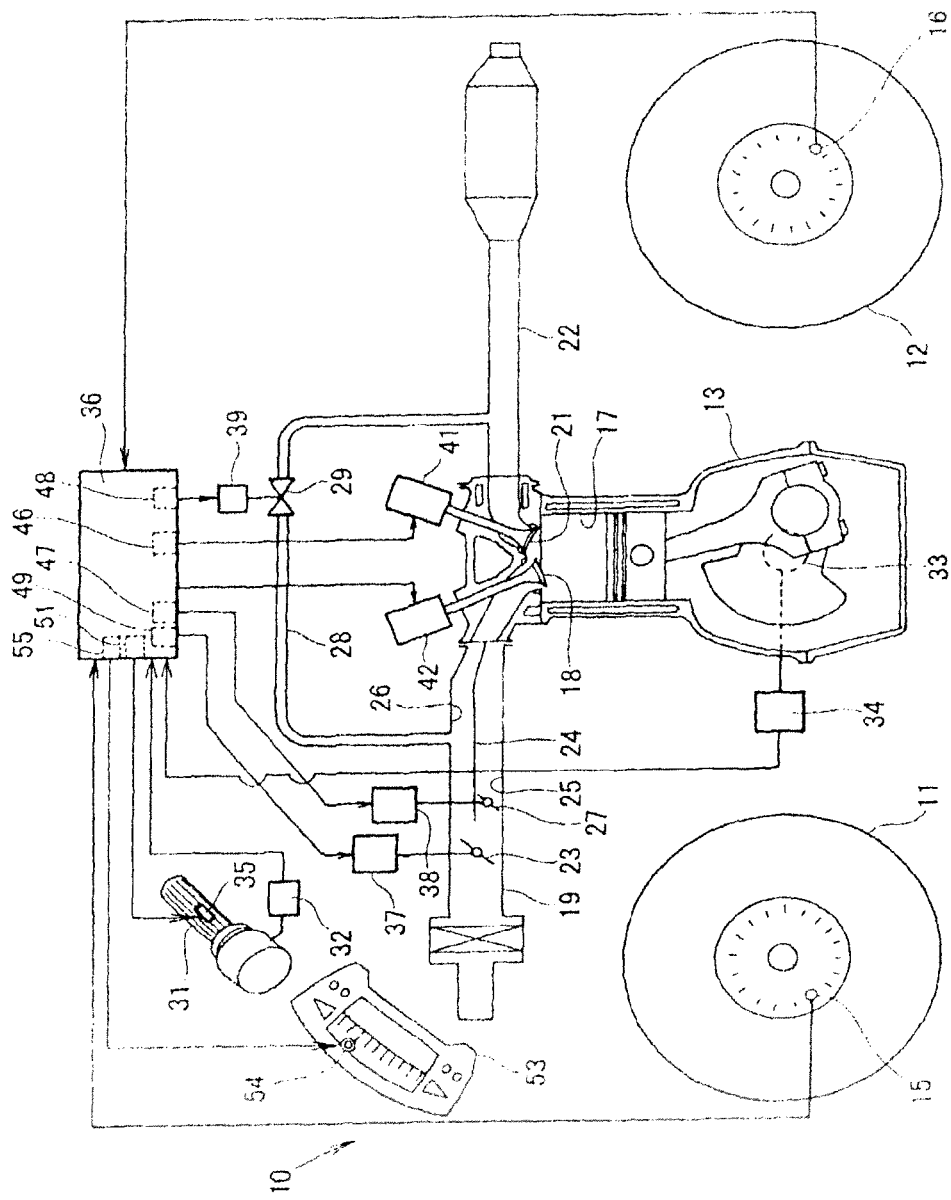
FIG. 1 is a principle diagram of a major part of a motorcycle according to an embodiment of the present invention.

As shown in FIG. 1, a motorcycle 10 includes a front wheel 11, a rear wheel 12, and an engine 13 disposed between the front wheel 11 and the rear wheel 12.

The front wheel 11 is provided with a front-wheel speed sensor 15 for detecting the rotational speed of the front wheel, and the rear wheel 12 is provided with a rear-wheel speed sensor 16 for detecting the rotational speed of the rear wheel.

The engine 13 is provided with an intake system 19 which can be, for example, an intake pipe by which air is supplied into a combustion chamber 17 through an intake valve 18, and an exhaust system or exhaust pipe 22 by which an exhaust gas is led out from the combustion chamber 17 through an exhaust valve 21.

The intake system 19 is provided with a throttle valve 23 for controlling the intake air amount, and the downstream or combustion chamber side of the throttle vale 23 is partitioned by a partition 24 into a swirl passage 25 and a bypass passage 26. The swirl passage 25 is provided therein with a swirl control valve 27 for controlling the quantity of air flowing through the swirl passage 25.

The bypass passage 26 and the exhaust system 22 are interconnected by an exhaust gas recirculation system 28. The exhaust gas recirculation system 28 is provided therein with an EGR valve 29 for controlling the flow rate of an exhaust gas flowing through the exhaust gas recirculation system 28.

An accelerator grip 31, to be gripped by the driver, is provided therein with a vibration generator 35, and is provided with an accelerator position or angle sensor 32 for detecting the operation amount of the accelerator grip 31 hereafter referred to as accelerator position.

In addition, a crankshaft 33 is provided with an engine rotational speed sensor 34 for detecting the rotational speed of the crankshaft 33, hereafter referred to as engine rotational speed.

Front-wheel speed information from the front-wheel speed sensor 15, rear-wheel speed information from the rear-wheel speed sensor 16, accelerator position information from the accelerator position sensor 32, and engine rotational speed sensor from the engine rotational speed sensor 34 are sent to a control unit 36.

The throttle valve 23 is actuated to open and close by a throttle valve actuator 37, the swirl control valve 27 is actuated to open and close by a swirl valve actuator 38, the EGR valve 29 is actuated to open and close by an EGR valve actuator 39, the exhaust valve 21 is actuated to open and close by an exhaust valve actuator 41, and the intake valve 18 is actuated to open and close by an intake valve actuator 42.

The control unit 36 controls the opening/closing of the throttle valve 23 by outputting an opening/closing command to the throttle valve actuator 37, according to the throttle angle or throttle position, for example.

In addition, the control unit 36 controls the opening/closing of the intake valve 18 and the exhaust valve 21 by outputting opening/closing commands to the intake valve actuator 42 and the exhaust valve actuator 41, with valve timings corresponding to the engine rotational speed, for example.

The control unit 36 is provided therein with an exhaust valve pulsative opening/closing control section 46 by which the exhaust valve 21 is opened and closed in a pulsating manner, a swirl valve pulsative opening/closing control section 47 by which the swirl control valve 27 is opened and closed in a pulsating manner, an EGR valve pulsative opening/closing control section 48 by which the EGR valve 29 is opened and closed in a pulsating manner, a throttle valve pulsative opening/closing control section 49 by which the throttle valve 23 is opened and closed in a pulsating manner, and a vibration generator control section 51.

Furthermore, a meter 53 to be visually checked by the driver is provided with informing unit or informing means 54 such as a lamp. The informing unit 54 is controlled by an informing unit control section 55 incorporated in the control unit 36.

Specifically, a slip factor is calculated from the speed difference between the front wheel speed and the rear wheel speed, and, when the slip factor exceeds or is expected to exceed a first threshold, an anti-slip control is executed. When information on the execution is obtained, the informing unit control section 55, for example, turns on the informing unit 54. This permits the driver to recognize that the anti-slip control is being executed.

When information on the execution of the anti-slip control is not obtained, the informing unit control section 55, for example, turns off the informing unit 54. This permits the driver to recognize that the anti-slip control is not being executed.

As is clear from the drawing, a preliminarily notifying unit or means, for example, the vibration generator 35, is provided, separately from the informing unit 54.

Now, throttle angle/throttle position, rate of change in throttle angle, slip factor, and acceleration decision will be described below.

Figure 2:
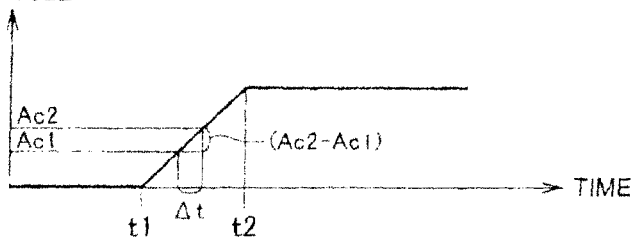
FIG. 2 shows graphs for illustrating an acceleration decision.
Figure 2:
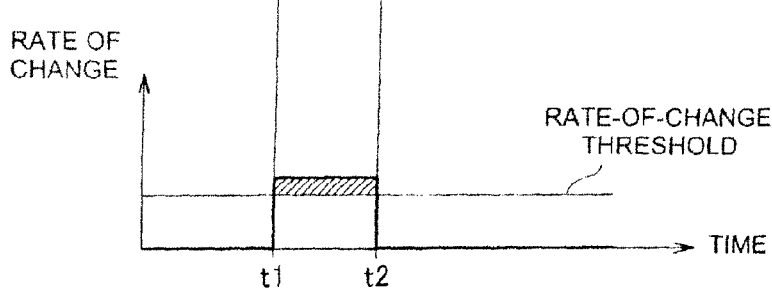
Figure 2:
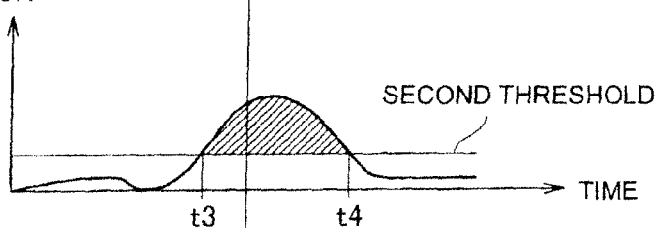
Figure 2:
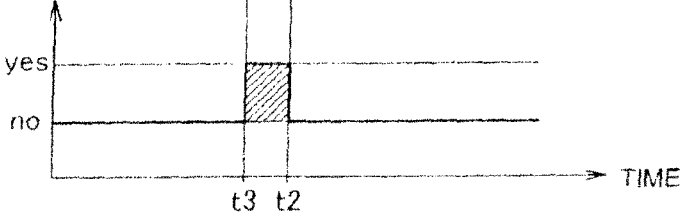

As shown in (a) of FIG. 2, the throttle angle varied toward an increasing side from time t1 to time t2. The rate of change during this process is computed by differentiation.

As shown in (b) of the figure, the rate of change during the period from time t1 to time t2 was higher than a predetermined rate-of-change threshold.

In addition, as shown in (c) of the figure, the slip factor determined from the difference between the front wheel speed and the rear wheel speed varies along a route in a mountain-like shape.

The relationship between the slip factor and the road surface grip force of tires will be described referring to FIG. 3.

Figure 3:
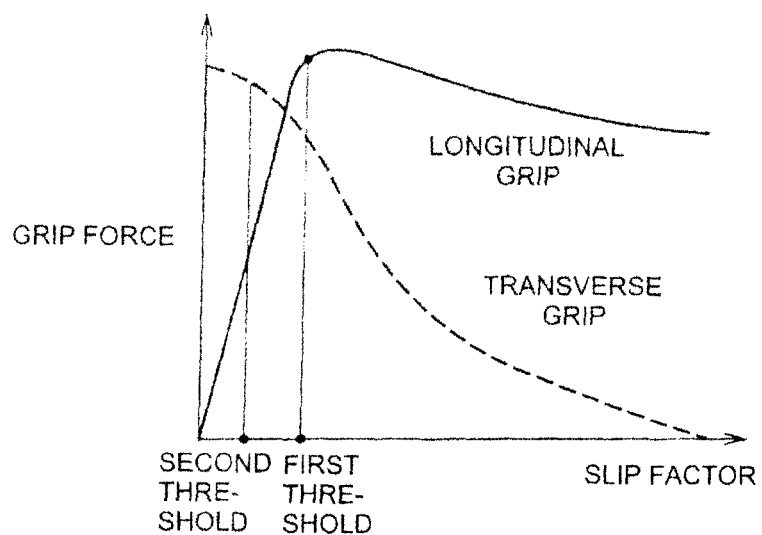
FIG. 3 is a graph for illustrating the correlation between a first threshold and a second threshold.

As shown in FIG. 3, a longitudinal grip force and a transverse grip force by tires vary as represented by the curves. The peak of the longitudinal grip curve is defined as a first threshold of slip factor.

When the slip factor has exceeded the first threshold, the control unit closes the throttle valve to lower the engine output, for the purpose of avoiding a slipping phenomenon.

In certain embodiments, a value lower than the first threshold (for example, a value of 50% of the first threshold) is defined as a second threshold. With the second threshold applied to (c) of FIG. 2, the slip factor is above the second threshold over the period from time t3 to time t4. In this example, t1<t3<t2<t4.

A region where (b) and (c) overlap each other is a region shown in (d) of the figure. In other words, an acceleration state is deemed as continuing over the period from time t3 to time t2.

The contents of the graphs as above are rearranged on a time series basis, to obtain a flowchart. Operation of the motorcycle will be described based on the flowchart.

Figure 4:
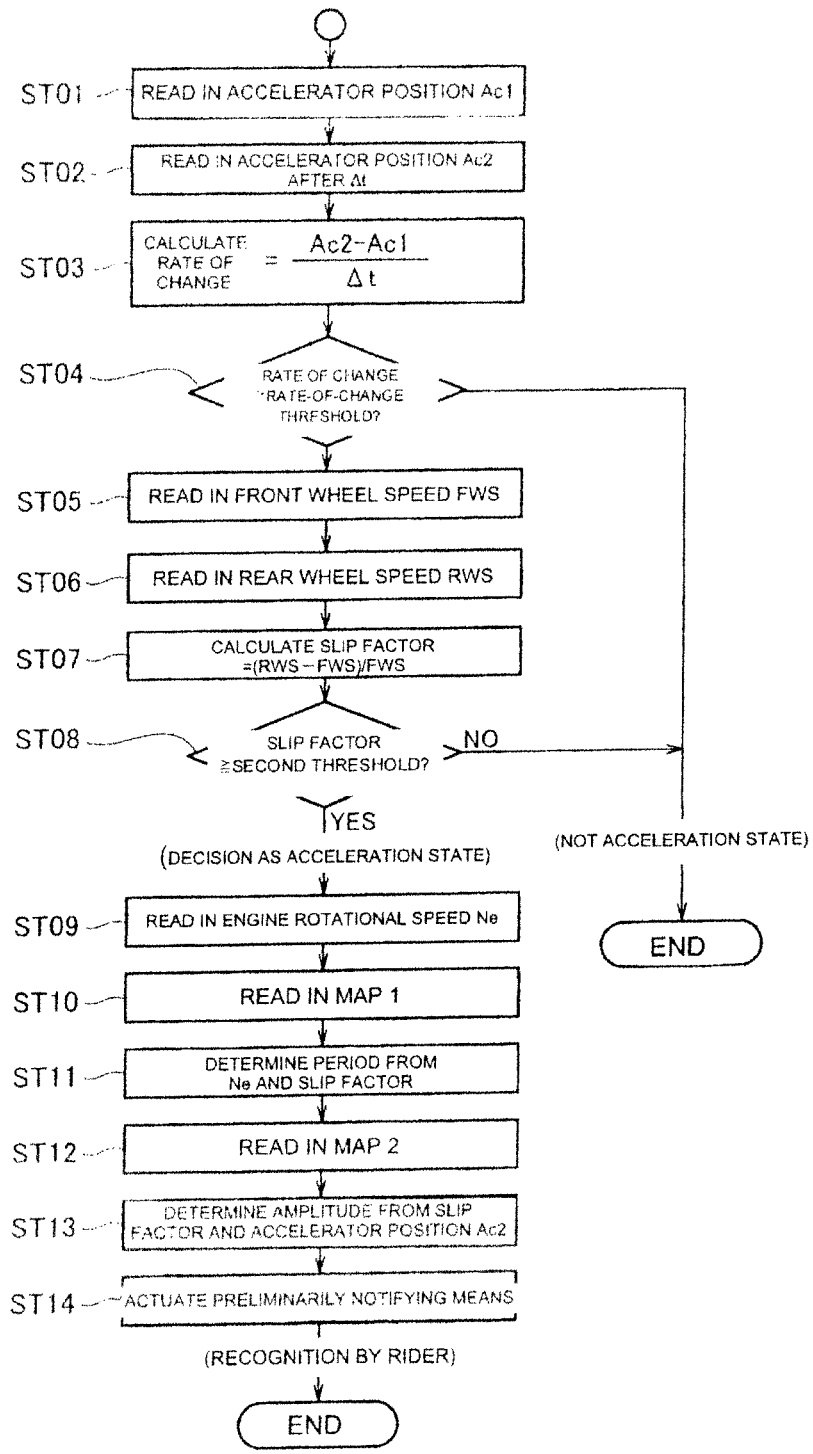
FIG. 4 is a flowchart of a control concerning preliminarily notifying unit according to embodiments of the present invention.

As shown in FIG. 4, an accelerator position Ac1 is read into the control unit (ST01). Next, after a minute time Δt, an accelerator position Ac2 is read in (ST02). Then, by use of a formula (Ac2−Ac1)/Δt, the rate of change in accelerator position is computed (ST03).

It is examined whether or not the rate of change obtained by the computation is at or above a rate-of-change threshold (ST04). If the rate of change is below the rate-of-change threshold, it is determined that the acceleration operation is so moderate that it cannot be said to be an acceleration state, and the flow of control is finished. If the rate of change is not less than the rate-of-change threshold, an acceleration state may possibly be present, and control is advanced to the next step.

The front wheel speed FWS is read in (ST05), and the rear wheel speed RWS is read in (ST06). By using a formula (RWS−FWS)/FWS, a slip factor is computed (ST07).

It is examined whether or not the slip factor obtained by the computation is at or above the second threshold (see FIG. 3) (ST08). When the examination result is negative (NO), it is determined that the current state cannot be said to be an acceleration state, and the flow of control is finished. When the slip factor is at or above the second threshold, the current state is decided as an acceleration state.

In other words, in embodiments of the present invention, the decision on the acceleration state is not made simply by the slip factor. The acceleration state decision is made based on two elements, namely, the rate of change in accelerator position and the slip factor.

When the current state is determined as an acceleration state, engine rotational speed Ne is read in (ST09). Then, Map 1 is read in (ST10).

Figure 5:
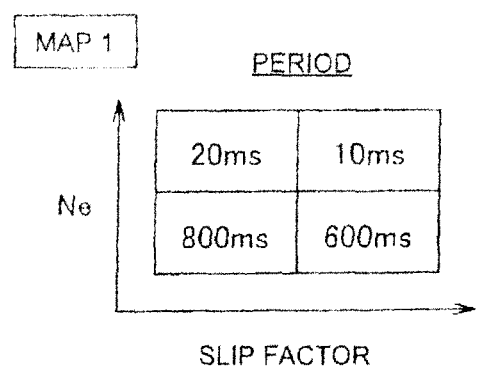
FIG. 5 shows an example of Map 1.

The slip factor obtained in ST07 and the engine rotational speed Ne read in in ST09 are fitted to Map 1 exemplified in FIG. 5, to determine the period (cycle) (ST11). Description of Map 1 will be made later.

Figure 6:
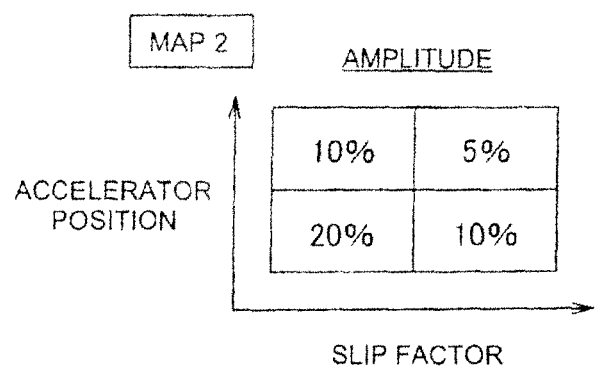
FIG. 6 shows an example of Map 2.

Next, the engine rotational speed Ne read in ST09 and the accelerator position Ac2 read in in ST02 are fitted to Map 2 exemplified in FIG. 6, to determine the amplitude (ST12). Description of Map 2 will be made later.

Figure 7:
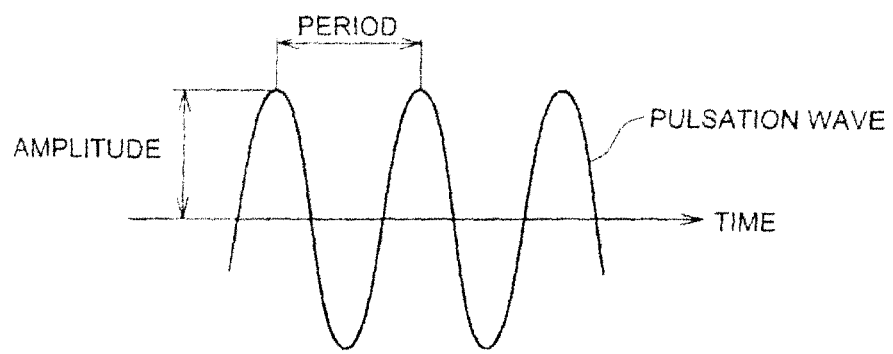
FIG. 7 illustrates a pulsation wave.

Since the period and the amplitude have been determined by these steps, a pulsation wave as shown in FIG. 7 can be drawn. Based on the pulsation wave, the preliminarily notifying unit is operated (ST14). Specifically, the vibration generator 35 shown in FIG. 1 is vibrated based on the pulsation wave. Then, the driver can recognize through the accelerator grip 31 that generation of a slip is approaching, and can take such a measure as returning the accelerator grip 31.

Figure 8:
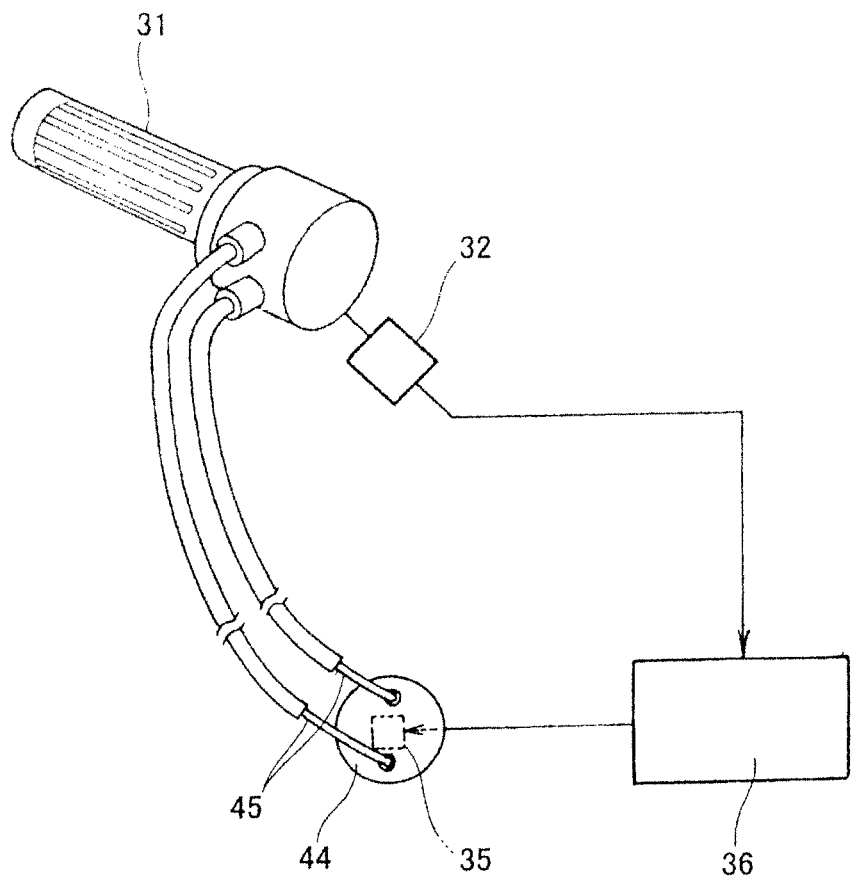
FIG. 8 is a perspective view illustrating an accelerator drum.

Or, as shown in FIG. 8, a throttle drum 44 is vibrated by the vibration generator 35. As a result, throttle wires 45 are vibrated and, further, the accelerator grip 31 is vibrated. The driver can recognize through the accelerator grip 31 that generation of a slip is approaching, and can take such a measure as returning the accelerator grip 31.

Figure 9:
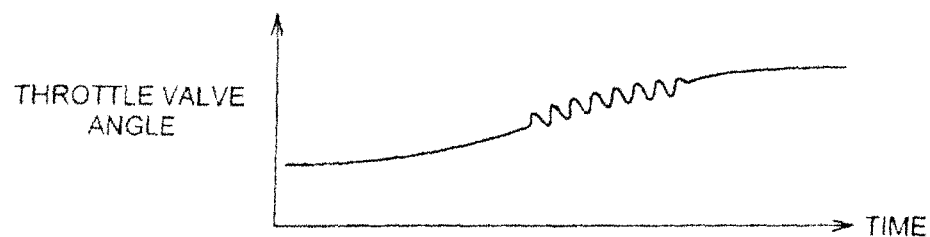
FIG. 9 is an operation diagram of a throttle valve.

Or, as shown in FIG. 9, throttle valve angle increases during acceleration. In this instance, if a preliminarily notifying command is outputted from the control unit, the throttle valve is put into opening-closing vibration based on the pulsation wave. Then, the quantity of intake air supplied to the engine is fluctuated, causing a change in engine noise or a change in engine vibration. As a result, the driver can recognize that generation of a slip is approaching and can take such a measure as returning the accelerator grip.

The engine noise can be changed not only by pulsation of the throttle valve but also by pulsation of the exhaust valve (FIG. 1, reference symbol 21), the swirl control valve (FIG. 1, reference symbol 27) or the EGR valve (FIG. 1, reference symbol 29).

Now, Map 1 and Map 2 will be explained.

In FIG. 5, as the engine rotational speed Ne is higher, the countermeasure against slip must be more strengthened, and, therefore, minute pulsation with a short period on the order of 10 to 20 ms is applied. When the engine rotational speed Ne is low, the countermeasure against slip may be weakened, and, therefore, slow pulsation with a long period on the order of 800 to 900 ms is applied.

The period or cycle is desirably determined based on the frequency of engine vibration. For instance, where the engine rotational speed is 6,000 rpm, which is equal to 100 revolutions per second, explosion in cylinder is carried out once per two revolutions. Thus, explosion is conducted 50 times in one second, so that the period of explosion is 20 ms.

When the period or cycle of the pulsation wave is 10 ms, the engine vibration is doubled, whereby the driver's recognition can be promoted. When the period of the pulsation wave is 800 to 900 ms, on the contrary, a high-pitched sound is mixed in the engine noise from time to time, so that the driver recognizes that the accelerating operation may be on a small scale.

Thus, taking into account the transmission of the engine noise or engine vibration to the driver, it is desired to determine the pulsation wave, particularly the period or cycle of the pulsation wave, on the basis of the engine.

In addition, as the slip factor is greater, the countermeasure against slip must be more strengthened, and, therefore, minute pulsation with a shorter period is applied. When the slip factor is small, the countermeasure against slip may be weakened, and, therefore, slow pulsation with a longer period is applied.

Here, investigating the application of pulsation to the throttle valve angle, the throttle valve is opened at an angle obtained by adding an amplitude to a normal control angle. As a result, the engine output is instantaneously increased in an abrupt manner.

In view of this, in FIG. 6, as the slip factor is greater, the amplitude is set smaller, whereby the maximum value of the throttle valve angle is suppressed. Besides, as the accelerator position is greater, the engine output is higher; in this instance, therefore, the amplitude is reduced so as to suppress the maximum value of the throttle valve angle.

When the slip factor is small or when the accelerator position is small, there is an allowance and, therefore, the amplitude can be enlarged.

Now, the effect of the present invention will be described below, taking as an example the case where the throttle valve angle is pulsated.

Figure 10:
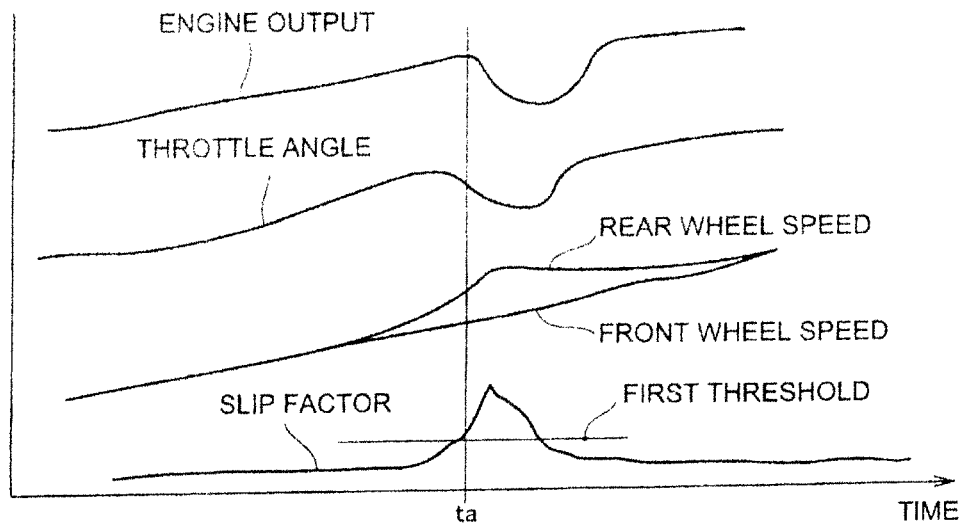
FIG. 10 shows graphs for comparing a related-art technology with the present invention.
Figure 10:
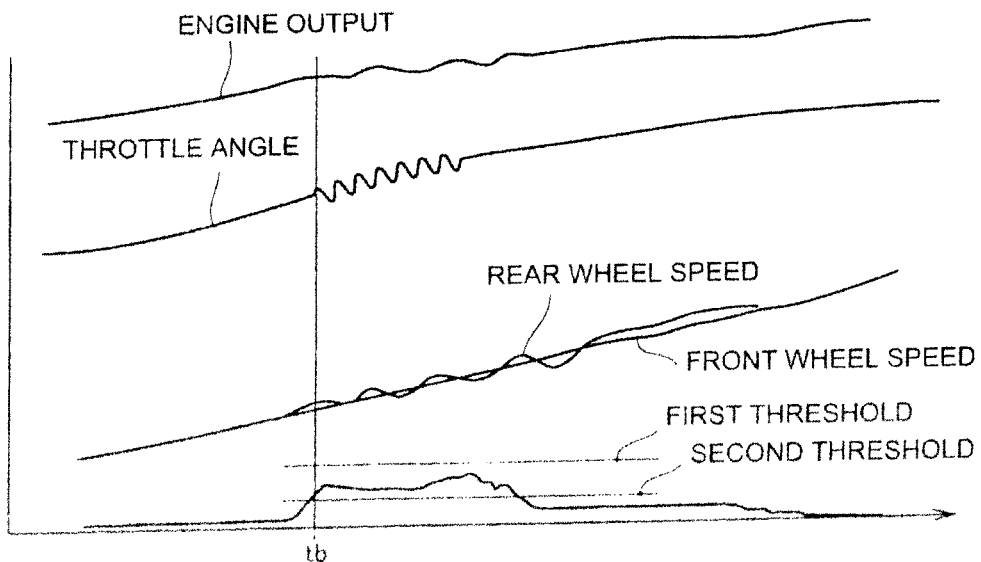

In FIG. 10, (a) shows a comparative example, wherein the slip factor reached or exceeded a first threshold, corresponding to the slip factor threshold in the related art at time ta, and, therefore, the control unit automatically reduced the throttle valve angle according to a conventional traction control. Though there is a time lag, the rear wheel speed gradually approached to the front wheel speed, whereby a slipping phenomenon was eliminated.

However, the engine output was abruptly reduced after time ta, and it took time to recover therefrom.

A reduction in engine output leads directly to a lowering in vehicle velocity, thereby heavily influencing a high-speed driving.

On the other hand, as shown in (b) of the figure pertaining to an example of the present invention, the slip factor reached or exceeded a second threshold at time tb and the rate of change in accelerator position also reached or exceeded a rate-of-change threshold, and, therefore, a pulsation control was applied to the throttle valve. The driver took such a measure as returning the accelerator grip a little; as a result, the rear wheel speed approached the front wheel speed, though there was some time lag. Since the measure was taken at the second threshold, the slip factor would not exceed the first threshold.

As a result, the lowering in engine output was minimized, and its influence on the high-speed driving was minimal.

Incidentally, while description has been made of an example in which the present invention is applied to a racing motorcycle, the invention may be applied to general motorcycles.

Besides, referring to FIG. 1, description has been made of the vibration generator 35 incorporated in the accelerator grip 31, pulsation of the exhaust valve 21, pulsation of the EGR valve 29, pulsation of the swirl control valve 27, and pulsation of the throttle valve 23, as the preliminarily notifying unit.

The motorcycle may not necessarily be provided with all these preliminarily notifying unit, and provision of at least one of them suffices.

Furthermore, in the present example, a configuration has been adopted in which decision of a slip is carried out using the slip factor and then the informing unit an indicator in a meter, and/or the preliminarily notifying unit is actuated. Naturally, a system in which engine torque is preliminarily computed and a slip is predicted based on the torque may also be used, wherein slip prevention is carried out according to the predicted slip and the informing unit and/or the preliminarily notifying unit is actuated.

The present invention is suitable for numerous vehicular applications, including to a motorcycle with specifications for racing.

DESCRIPTION OF REFERENCE SYMBOLS

10 . . . Motorcycle, 11 . . . Front wheel, 12 . . . Rear wheel, 13 . . . Engine, 21 . . . Exhaust valve, 23 . . . Throttle valve, 31 . . . Accelerator grip, 35 . . . Vibration generator, 36 . . . Control unit, 45 . . . Throttle wire, 46 . . . Exhaust valve pulsative opening/closing control section, 47 . . . Swirl valve pulsative opening/closing control section, 48 . . . EGR valve pulsative opening/closing control section, 49 . . . Throttle valve pulsative opening/closing control section, 54 . . . Informing unit.

The invention claimed is:

1. A vehicle, comprising:
an anti-slip device configured to detect a front wheel speed and a rear wheel speed at a time of acceleration, compute a slip factor from a speed difference between said front wheel speed and said rear wheel speed, and, when said slip factor has exceeded or is expected to exceed a first threshold, the anti-slip device is configured to close a throttle valve so as to lower an engine output and thereby to prevent a wheel or wheels from slipping;
an informing unit configured to inform a driver that an anti-slip control is being performed;
a preliminarily notifying unit configured to, when said slip factor has reached or exceeded or is expected to reach or exceed a second threshold set smaller than said first threshold, inform the driver that said slip factor reaches or exceeds said second threshold, said preliminarily notifying unit being provided separately from said informing unit.

2. The vehicle according to claim 1, wherein said preliminarily notifying unit comprising a vibration generator incorporated in an accelerator grip configured to be gripped by the driver.

3. The vehicle according to claim 1, wherein said preliminarily notifying unit comprising a vibration generator operative to vibrate a throttle wire interconnecting an accelerator grip to be gripped by the driver and said throttle valve.

4. The vehicle according to claim 1, wherein said preliminarily notifying unit comprises at least one of an exhaust valve pulsative opening/closing control section by which an exhaust valve provided in an exhaust system is opened and closed in a pulsating manner, a swirl valve pulsative opening/closing control section by which a swirl control valve provided in an intake system so as to control an intake flow at an engine combustion chamber is opened and closed in a pulsating manner, and an EGR valve pulsative opening/closing control section by which an EGR valve provided in an exhaust gas recirculation system is opened and closed in a pulsating manner.

5. The vehicle according to claim 1, wherein said preliminarily notifying unit comprises a throttle valve pulsative opening/closing control section by which said throttle valve is opened and closed in a pulsating manner.

6. The vehicle according to claim 5, wherein a period of a pulsation wave created by said throttle valve pulsative opening/closing control section is determined based on a period of explosion in an engine.

7. The vehicle according to claim 1, wherein the vehicle comprises a motorcycle.

8. A method of notifying a driver of anti-slip operation in a vehicle, said method comprising:
detecting, by a senor a front wheel speed and a rear wheel speed of the vehicle at a time of acceleration;
computing, by a control unit, a slip factor from a speed difference between the front wheel speed and the rear wheel speed;
closing, by the control unit, a throttle valve so as to lower an engine output and thereby to prevent a wheel or wheels from slipping, when the slip factor has exceed or is expected to exceed a first threshold;
preliminarily notifying a driver, by a notifying unit, when the slip factor has reached or exceeded or is expected to reach or exceed a second threshold set smaller than the first threshold, that the slip factor reaches or exceeds the second threshold; and
informing, by an informing unit, a driver that an anti-slip control is being performed, at such time as anti-slip control is being performed,
wherein the preliminarily notifying and the informing are performed by separate devices.

9. The method according to claim 8, wherein the preliminarily notifying comprises vibrating a throttle wire interconnecting an accelerator grip.

10. The method according to claim 8, wherein the informing comprises providing a visual indicator to the driver.

11. The method according to claim 10, wherein the informing comprises illuminating a light source.

* * * * *